(12) United States Patent
Zhang et al.

(10) Patent No.: US 11,323,891 B2
(45) Date of Patent: May 3, 2022

(54) EVALUATING THE WIRELESS PERFORMANCE OF A BUILDING

(71) Applicant: Ranplan Wireless Network Design Ltd, Cambridge (GB)

(72) Inventors: Jie Zhang, Cambridge (GB); Jiliang Zhang, South Yorkshire (GB); Andres Alayón Glazunov, Enschede (NL); Hui Song, Cambridge (GB)

(73) Assignee: RANPLAN WIRELESS NETWORK DESIGN LTD, Cambridge (GB)

( * ) Notice: Subject to any disclaimer, the term of this patent is extended or adjusted under 35 U.S.C. 154(b) by 0 days.

(21) Appl. No.: 17/255,609

(22) PCT Filed: Jul. 1, 2019

(86) PCT No.: PCT/GB2019/051869
§ 371 (c)(1),
(2) Date: Dec. 23, 2020

(87) PCT Pub. No.: WO2020/008181
PCT Pub. Date: Jan. 9, 2020

(65) Prior Publication Data
US 2021/0266759 A1 Aug. 26, 2021

(30) Foreign Application Priority Data
Jul. 4, 2018 (GB) ...................... 1810995

(51) Int. Cl.
*H04W 16/22* (2009.01)
*H04B 17/336* (2015.01)
*H04W 24/02* (2009.01)

(52) U.S. Cl.
CPC ........ *H04W 16/225* (2013.01); *H04B 17/336* (2015.01); *H04W 24/02* (2013.01)

(58) Field of Classification Search
CPC .................................................... H04W 16/20
See application file for complete search history.

(56) References Cited

U.S. PATENT DOCUMENTS

| 6,446,031 | B1 | 9/2002 | Welch | |
|---|---|---|---|---|
| 2004/0038683 | A1* | 2/2004 | Rappaport | ............. H04B 17/23 455/446 |

(Continued)

FOREIGN PATENT DOCUMENTS

| CN | 103974285 A | 8/2014 |
|---|---|---|
| CN | 103974285 B | 10/2017 |

(Continued)

OTHER PUBLICATIONS

Atzori, L. et al. (2010, e-published Jun. 1, 2010)."The Internet of Things: A survey," Computer Networks, vol. 54, No. 15, pp. 2787-2805.

(Continued)

*Primary Examiner* — Kevin Kim
(74) *Attorney, Agent, or Firm* — Mintz Levin Cohn Ferris Glovsky and Popeo, P.C.

(57) ABSTRACT

A method for evaluating a buildings wireless performance, the method comprising: constructing an environment model, the environment model comprising a layout of the building, a power density of transmitters $P_T[W/m^2]$, and a considered frequency band $f_c$; computing a signal to interference plus noise ratio (SINR) for the building in dependence on the environment model; computing a SINR for an open space in dependence on the environment model, the computing size for the open space being the same as the computing size of the building, and wherein the open space is an ideal space in absence of the building or other surroundings; comparing the SINR for the building with the SINR for the open space; and in dependence on the comparison, evaluating the build- (Continued)

ing wireless performance by calculating an interference power gain and an intended power gain for the building.

20 Claims, 3 Drawing Sheets

(56) References Cited

U.S. PATENT DOCUMENTS

2004/0143428 A1 7/2004 Rappaport et al.
2017/0338901 A1 11/2017 Zhihua et al.

FOREIGN PATENT DOCUMENTS

| EP | 1835636 A2 * | 9/2007 | .......... H04W 52/244 |
|----|---|---|---|
| TW | I 624 168 B | 5/2018 | |
| WO | WO-2015/097482 A1 | 7/2015 | |
| WO | WO-2017/039521 A1 | 3/2017 | |
| WO | WO-2018060089 A1 * | 4/2018 | ......... H04L 12/2834 |
| WO | WO-2020/008181 A1 | 1/2020 | |

OTHER PUBLICATIONS

Azpilicueta, L. et al. (2017). "A Hybrid Ray Launching-Diffusion Equation Approach for Propagation Prediction in Complex Indoor Environments," IEEE Ant. Wireless Prop. Lett. vol. 16, pp. 214-217.
Bai, T. et al. (2014). "Analysis of blockage effects on urban cellular networks," IEEE Trans. Wireless Commun., vol. 13, No. 9, pp. 5070-5083.
Bai, T. et al. (2015). "Coverage and Rate Analysis for Millimeter-Wave Cellular Networks," IEEE Trans. Wireless Commun. vol. 4, No. 2, pp. 1100-1114.
Cheshire, D. et al., (2013). "Evaluating Operational Energy Performance of Buildings at the Design Stage CIBSE TM54." The Chartered Institution of Building Services Engineers London. 34 pages.
Combined Search and Examination Report issued in GB Application No. GB1810995.9, dated Dec. 6, 2018, 6 pages.
International Search Report and Written Opinion issued in International Application No. PCT/GB2019/051869, dated Sep. 9, 2019 (dated Sep. 9, 2019). 13 pages.
Muller, M.K. et al. (2017). "Analyzing Wireless Indoor Communications by Blockage Models," IEEE Access, vol. 5, pp. 2172-2186.

* cited by examiner

EVALUATING THE WIRELESS PERFORMANCE OF A BUILDING

CROSS-REFERENCE TO RELATED APPLICATIONS

This application is a Section 371 US national phase of International Application No. PCT/GB2019/051869 filed Jul. 1, 2019, which claims priority to GB Application No. 1810995.9 filed Jul. 4, 2018.

FIELD OF THE INVENTION

The present invention relates to wireless communications. More particularly, the present invention relates to a method for evaluating the wireless performance of a building so as to facilitate optimal construction or decoration of the building targeting a good performance of wireless networks within it.

TECHNICAL BACKGROUND

Wireless communication plays an important role in the smart building/city agenda. In a smart building, the internet of things (IoTs) will be connected wirelessly to increase comfort of the indoor environment while reducing energy consumption. Hence, pursuing high capacity and reliable wireless communications indoors is fundamental and crucial.

In wireless networks, interference is unwanted radio signal received at a receiver. The power of the intended signal and that of the interference signal at any given position indoors are determined by radio propagation that is affected by the layout of building structures. It is predictable that the building itself has a significant impact on wireless capacity.

Therefore, different types of buildings have intrinsic wireless performances, independent of how densely small cells are deployed, or of the massive MIMO array antenna deployed. It is therefore reasonable to assume that the wireless network might not provide the desired indoor wireless performance in certain type of buildings as resources like frequency bands and power are limited. However, if a building is designed by taking its wireless performance into account at an early stage, then the desired wireless coverage and capacity would be considerably improved. This can be achieved, e.g., by providing building designers, both civil engineers and architects, with guidance on how to predict the wireless performance of buildings at the design stage. The wireless performance of the building itself has been ignored so far, which will be very important for future smart buildings in which appliances will be connected wirelessly. In the moment, the wireless metrics of building are not well designed considering layout of building structures. There is no publication focused on building wireless metric modelling or fast computation either.

In the last century, the building design and construction community had been focused on improving safety, visual and thermal comfort, and indoor air quality. In the last decade, energy efficiency has become an important metric in building design, as set out in L. Atzori, et al., "The internet of things: a survey," Computer Networks, vol. 54, no. 15, pp. 2787-2805, 2010. For example, CIBSE, "TM54: evaluating operational energy performance of buildings at the design stage," CIBSE, 2013, sets out how the operational energy required for a building can be predicted, where covering lighting, heating, ventilation and cooling and provision of hot water are considered.

Previous works have investigated the impact of building blockage on small cell networks. For example, T. Bai, et al., "Coverage and rate analysis for millimeter-wave cellular networks," IEEE Trans. Wireless Commun., vol. 4, no. 2, pp. 1100-1114, 2015, provided an analytic coverage rate by approximating the line of sight (LOS) region as a fixed LOS ball for a general LOS probability function. In M. K. Muller, et al., "Analyzing wireless indoor communications by blockage models," IEEE Access, vol. 5, pp. 2172-2186, 2017, four random wall generation methods to place blockage objects in an indoor scenario were proposed and analysed. Walls are either distributed randomly, semi-deterministically or heuristically. However, most of previous evaluation on the blockage effect is to assume buildings to form a process of random shapes, e.g., a Boolean scheme of rectangles, as in T. Bai, et al., "Analysis of blockage effects on urban cellular networks," IEEE Trans. Wireless Commun., vol. 13, no. 9, pp. 5070-5083, 2014, which are assumed to be homogenous. The homogenous blockage model is promising to provide insights on how to configure wireless network in a blockage scenario, but it is not suitable for evaluate specific inhomogeneous buildings in the real world.

We describe herein the first work on evaluating building wireless performance based on given building layouts that will shed light on achievable wireless network performance in buildings.

Rather than random blockages, ray-tracing/ray-launching technologies are employed to evaluate the performance of networks indoors for specific buildings, as set out in L. Azpilicueta, et al., "A hybrid ray launching-diffusion equation approach for propagation prediction in complex indoor environments," IEEE Ant. Wireless Prop. Lett., vol. 16, pp. 214-217, 2017. However, on one hand, results attained through this approach are always obtained for a specific deployment of network, and therefore are not general enough to evaluate buildings. We need to evaluate the building with tractable models, which are specified by a small set of parameters of wireless networks. On the other hand, the realization of ray-tracing/ray-launching is computational expensive when the environment is complicate, and therefore it is not applicable to evaluate buildings for all possible configurations of networks in a reasonable time.

SUMMARY OF THE INVENTION

According to a first aspect there is provided a method for evaluating a building's wireless performance, the method comprising: constructing an environment model, the environment model comprising a layout of the building, a power density of transmitters $P_T[W/m^2]$, and a considered frequency band $f_c$, computing a signal to interference plus noise ratio (SINR) for the building in dependence on the environment model; computing a SINR for an open space in dependence on the environment model, the computing size for the open space being the same as the computing size of the building, and wherein the open space is an ideal space in absence of the building or other surroundings; comparing the SINR for the building with the SINR for the open space; and in dependence on the comparison, evaluating the building wireless performance by calculating an interference power gain and an intended power gain for the building.

The interference power gain and the intended power gain for the building may be defined by the following equation, $$\gamma_B = G_I \gamma_{os} + G_P$$

where $G_I$ is the interference power gain, $G_P$ is the intended power gain, $\gamma_{os}$ is the SINR for the open space, and $\gamma_B$ is the SINR for the building.

The SINR for the open space may be computed by $$\gamma_{os} = \frac{P_{os}}{I_{os} + \sigma^2},$$

and the SINR for the building may be computed by $$\gamma_B = \frac{P_B}{I_B + \sigma^2},$$

where $P_{os}$ and $I_{os}$ respectively denote an overall power of an intended signal and an interference signal at a reference point in the open space, and $P_B$ and $I_B$ respectively denote an overall power of an intended signal and an interference signal at a reference point in the building, $\sigma^2$ denotes the power of noise, and wherein the interference power gain ($G_I$) and the intended power gain ($G_P$) may be calculated by:

$$G_I = \frac{I_{os} + \sigma^2}{I_B + \sigma^2},$$

$$G_P = \frac{P_B - P_{os}}{I_B + \sigma^2}.$$

The overall power of the intended signal $P_B$ may comprise a LOS intended signal $P_L$, and an NLOS intended signal $P_N$, and the overall power of the interference signal $I_B$ may comprise a LOS interference signal $I_L$, and an NLOS interference signal $I_N$, the overall power of the intended signal $P_B$ and the overall power of the interference signal $I_B$ being defined by:

$$P_B = P_L + P_N,$$

$$I_B = I_L + I_N.$$

The interference power gain ($G_I$) and the intended power gain ($G_P$) may be calculated by:

$$G_I = \frac{I_{os} + \sigma^2}{I_L + I_N + \sigma^2},$$

$$G_P = \frac{\Delta P}{I_L + I_N + \sigma^2}.$$

The environment model may comprise a building model and a network model, the building model comprising the layout of the building, and the network model comprising positions of user equipment (UE), the power density of transmitters $P_T[W/m^2]$, and the considered frequency band $f_c$. and wherein the method may further comprise:

1) selecting a propagation model for calculating a path loss;
2) dividing the building into UE points in a fixed resolution;
3) calculating a receiving power from the transmitters in each UE point with the building;
4) calculating a receiving power from the transmitters in each UE point in the open space;
5) calculating the receiving interference signal and intended signal for each UE point within the building separately;
6) calculating the receiving interference signal and intended signal for each UE point in the open space separately;
7) Calculating the overall power of interference signal $I_B$ and the overall power of intended signal $P_B$ for each UE point in the building, and the overall power of interference signal $I_{os}$ and the overall power of intended signal $P_{os}$ for each UE point in the open space;
8) calculating the interference power gain ($G_I$) and intended power gain ($G_P$) for each UE point for the building.

The propagation model may obey the law of conservation of energy and converge when the distance between a transmitter and a UE is infinitely large or infinitely small.

The network model may be further restricted as an infinite number of transmitters, the transmitters being uniformly distributed in the environment, a reference UE taking use of all detectable power constrained by the sensitivity of its receiver, wherein detectable power is considered as the intended signal, and undetectable power is considered as the interference signal, wherein the detectable power may be defined as the power that is transmitted from transmitters that satisfy, $P_T L_s(R) > P_{th}$ and the undetectable power may be defined as the power that is transmitted from transmitters that satisfy $P_T L_s(R) \leq P_{th}$, where $s \in \{os, B\}$, denotes the distance from the reference UE to a reference transmitter, $L_s(R)$ denotes the pathloss from the reference UE to the reference transmitter in the distance of R, $\Omega$ denote an arbitrary area, $P_{th}[W/m^2]$ denotes a threshold constrained by the sensitivity of the UE receiver, for an arbitrary area $\Omega$, the total transmit power from transmitter within $\Omega$ is $P_T A_\Omega$, where $A_\Omega$ is the area of $\Omega$; wherein the method may further comprise:

calculating the intended signal, $P_{os}$, by the following equation:

$$P_{os} = \int_{P_T L_{os}(R) > P_{th}} P_T L_{os}(R) d\Omega;$$

calculating the interference signal, $I_{os}$, by the following equation:

$$I_{os} = \int_{P_T L_{os}(R) \leq P_{th}} P_T L_{os}(R) d\Omega;$$

calculating the intended signal $P_B$ by the following equation:

$$P_B = \int_{P_T L_B(R) > P_{th}} P_T L_B(R) d\Omega; \text{ and}$$

calculating the interference signal $I_B$ by the following equation:

$$I_B = \int_{P_T L_B(R) \leq P_{th}} P_T L_B(R) d\Omega,$$

where $I_{os}(R)$ denotes a pathloss from the reference UE to the reference transmitter in the distance of R in the open space, $L_B(R)$ denotes a pathloss from the reference UE to the referred transmit element in the distance of R in the building model.

The values of $P_{os}$ and $I_{os}$ may be calculated by the following equations:

$$P_{os} = \int_0^{2\pi} \int_0^{R_{os}} P_T L_{os}(R) dR d\theta,$$

$$I_{os} = \int_0^{2\pi} \int_{R_{os}}^{+\infty} P_T L_{os}(R) dR d\theta,$$

where $R_{os}$ denotes the coverage distances under open space.

The building model may be separated into a plurality of $N_{TM}$ Toy Models (TM), and $P_L$, $I_L$, $P_N$, and $I_N$ may be calculated by the following equations:

$$P_L = \sum_{n_{TM}=1}^{N_{TM}} P_{L,n_{TM}},$$

$$I_L = \sum_{n_{TM}=1}^{N_{TM}} I_{L,n_{TM}},$$

$$P_N = \sum_{n_{TM}=1}^{N_{TM}} P_{N,n_{TM}}.$$

$$I_N = \sum_{n_{TM}=1}^{N_{TM}} I_{N,n_{TM}},$$

where $P_{L,n_{TM}}$, $I_{L,n_{TM}}$, $P_{N,n_{TM}}$, and $I_{N,n_{TM}}$ respectively denote the LOS intended signal, LOS interference signal, NLOS intended signal and NLOS interference signal for one TM, wherein $1 \leq n_{TM} \leq N_{TM}$.

Each TM may be separated into at most four areas, the said four areas being $\Omega_{PL}$, $\Omega_{IL}$, $\Omega_{PN}$, and $\Omega_{IN}$, and wherein $P_{L,n_{TM}}$, $I_{L,n_{TM}}$, $P_{N,n_{TM}}$, and $I_{N,n_{TM}}$ may be calculated by the following equations:

$$P_{L,n_{TM}} = \int_{\Omega_{PL}} P_T L_L(R) d\Omega,$$

$$I_{L,n_{TM}} = \int_{\Omega_{IL}} P_T L_L(R) d\Omega,$$

$$P_{N,n_{TM}} = \int_{\Omega_{PN}} P_T L_N(R) d\Omega,$$

$$I_{N,n_{TM}} = \int_{\Omega_{IN}} P_T L_L(R) d\Omega,$$

where $\Omega_{PL}$, $\Omega\Omega_{IL}$, $\Omega_{PN}$, and $\Omega_{IN}$ denote the areas contributing to the LOS intended signals, the LOS interference signals, the NLOS intended signals, and the NLOS interference signals at the reference UE, respectively.

The propagation model may be further defined as the two-ray ground-reflection model, wherein the path loss in the open space, LOS and NLOS indoor scenarios may be respectively predicted by the following equations.

$$L_{os}(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq \frac{4\pi}{\lambda h_T h_R}, \\ (h_T h_R)^2 R^{-4}, & \text{when } \frac{4\pi}{\lambda h_T h_R} < R, \end{cases}$$

$$L_L(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq 1, \\ \left(\frac{\lambda}{4\pi}\right)^2 R^{-n_L}, & \text{when } 1 < R, \end{cases}$$

$$L_N(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq 1, \\ \left(\frac{\lambda}{4\pi}\right)^2 R^{-n_N}, & \text{when } 1 < R, \end{cases}$$

where $$\lambda = \frac{c}{f_c}$$

denotes the wavelength of microwave. $c = 3 \times 10^8$ [m/s] is the speed of light, $f_c$ is the center frequency, $h_T$ and $h_R$, respectively denote the transmitter's height and the receiver's height. $n_L$, and $n_N$ are the path loss exponent (PLE). the value of $n_L$, and $n_N$ are determined by the environment, $L_{os}(R)$, $L_L(R)$, and $L_R(R)$, respectively denote the path loss under open space, LOS and NLOS indoor scenarios, R denotes the distance from the reference UE to the referred transmit element.

We describe herein an analytic framework to evaluate the wireless performance of buildings. On one hand, taking the open space scenario as a benchmark, metrics to measure wireless performances of buildings are well defined considering the impact of blockage, bounce reflections, and waveguide effect introduced by building structures.

The advantages of the method described herein include:
The proposed metrics capture the impact of a building on the wireless network within it. The impacts may include blockage, bounce reflection and waveguide effect.
The proposed metrics are independent from specific deployment of small cells/distributed massive MIMO. Instead, they show a performance upper bound on networks indoors to reduce the set of parameters.
Through the approach described herein, proposed metrics can be quickly and exactly computed to facilitate fast evaluation of buildings.
The approach to compute metrics in closed forms described herein sheds light on optimization of building layout for architects.

BRIEF DESCRIPTION OF THE DRAWINGS

The present invention will now be described by way of example with reference to the accompanying drawings. In the drawings.

DETAILED DESCRIPTION OF THE INVENTION

Figure 1:
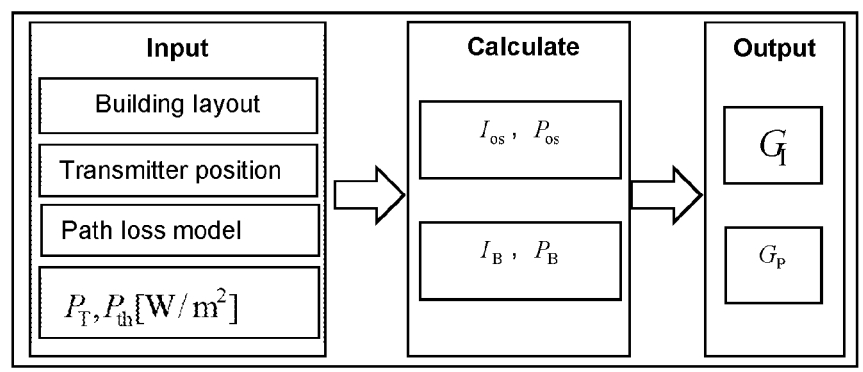
FIG. 1 is a flow diagram depicting the computation procedure for gains $G_I$ and $G_P$.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Generally, the wireless performance of a building can be defined by the coverage performance, the leakage performance, the capacity performance, or various other performance metrics. In the method described herein, the wireless performance of a building is investigated by evaluating the impact of building structures on the signal to interference plus noise ratio (SINR), since the SINR constitutes a basis for further important metrics in wireless communications, such as coverage performance and capacity performance. The wireless performance of a building is constrained by the building structure, which has no relationship with the deployment of antenna arrays and small cells. In the method described herein, we derive values for the interference power gain ($G_I$) and the intended power gain ($G_P$) at a reference position of a building. The interference power gain ($G_I$) and the intended power gain ($G_P$) of a building are metrics that can be used to understand a building's wireless performance.

Definition of Interference Gain $G_I$ and Power Gain $G_P$

The impact of a building on its wireless network is evaluated by comparing the signal to interference plus noise ratio (SINR) indoors with that in the open space.

The open space is a space which has no buildings or other surroundings. This means that no reflection, diffraction or transmission effects are introduced by a building's structure. Computationally, the size of the open space is limited to the same space as that of the building size. In the method described herein, we can assume that the differences between the evaluated SINR for the building and the SINR for the open space are as a result of the building structure.

We propose herein an analytic framework to evaluate the wireless performance of a building. Taking the open space environment as a benchmark, metrics to measure wireless performances of a building are defined considering the impact of blockage, bounce reflections, and waveguide effect introduced by building structures. Through the approach, proposed metrics can be quickly and exactly computed.

We investigate the impact of building structures on the SINR since it constitutes a basis for further important metrics in wireless communications, such as coverage and rate. We define the interference gain $G_I$ and the power gain $G_P$ of buildings as the effective increase in the SINR by covering the building relative to the SINR in the open space scenario. $G_I$ is to capture the impact of blockage of interference signals by building structures. $G_P$ is to capture the impact of the building on the power of intended signals, where both the blockage and the waveguide effect are considered.

In the open space, the SINR is computed by $\gamma_{os}$:

$$\gamma_{os} = \frac{P_{os}}{I_{os} + \sigma^2}, \quad (1)$$

where $P_{os}$ and $I_{os}$ respectively denote the overall power of intended signal and interference signal in the open space at the reference position, and $\sigma^2$ denotes the power of noise.

Whereas with the impact of the building, the SINR in the building is computed by $\gamma_B$:

$$\gamma_B = \frac{P_B}{I_B + \sigma^2}, \quad (2)$$

where $P_B$ and $I_B$ respectively denote the overall power of intended signal and interference signal at the reference in the building.

The signal received in the building could be separated into two parts. One part is the Line-of-Sight (LOS) signal, and the other part is the Non-Line-of-Sight (NLOS) signal. Then the overall power of the intended signal in the building could be separated into $P_L$ and $P_N$, where $P_L$ and $P_N$, respectively, denote received powers of intended signals from LOS and NLOS small cells/antenna elements. The overall interference signal in the building could be separated into $I_L$ and $I_N$, respectively. $I_L$ and $I_N$ denote the LOS and the NLOS received powers of interference signals.

That is:

$$P_B = P_L P_N, \quad (3)$$

$$I_B = I_L + I_N. \quad (4)$$

Therefore, we have the expression of the SINR in the building as:

$$\gamma_B = \frac{P_L + P_N}{I_L + I_N + \sigma^2}. \quad (5)$$

Combining (1) and (5), we obtain $$\gamma_B = \frac{(I_{os} + \sigma^2)\gamma_{os} + \Delta P}{I_L + I_N + \sigma^2} = G_I \gamma_{os} + G_P, \quad (6)$$

where $\Delta P = P_L + P_N - P_{os}$, and $$G_I = \frac{I_{os} + \sigma^2}{I_B + \sigma^2} = \frac{I_{os} + \sigma^2}{I_L + I_N + \sigma^2}, \quad (7)$$

$$G_P = \frac{\Delta P}{I_B + \sigma^2} = \frac{\Delta P}{I_L + I_N + \sigma^2}, \quad (8)$$

where $G_I$ and $G_P$ denote the interference gain and the power gain of the building compared with the open space, respectively.

It is needed to emphasize that at different positions in the room, $G_I$ and $G_P$ have different values. To facilitate the comparison of rooms in terms of wireless performance, for each considered room, we compute the average $G_I$ and the average $G_P$ for a given room.

Calculating the Interference Gain $G_I$ and Power Gain $G_P$

A method for calculating $G_I$ and $G_P$ is schematically depicted in FIG. 1.

As shown in FIG. 1, the input information may include:
1. The building layout, specifically the region inside the building is evaluated.
2. The position of one or more transmitters.
3. A path loss model, taking the transmit frequency $f_c$ into account.
4. The transmit power density of the transmitters ($P_T$[W/m$^2$]). and a threshold constrained by the sensitivity of the UE receiver ($P_{th}$[W/m$^2$]).

Figure 2:
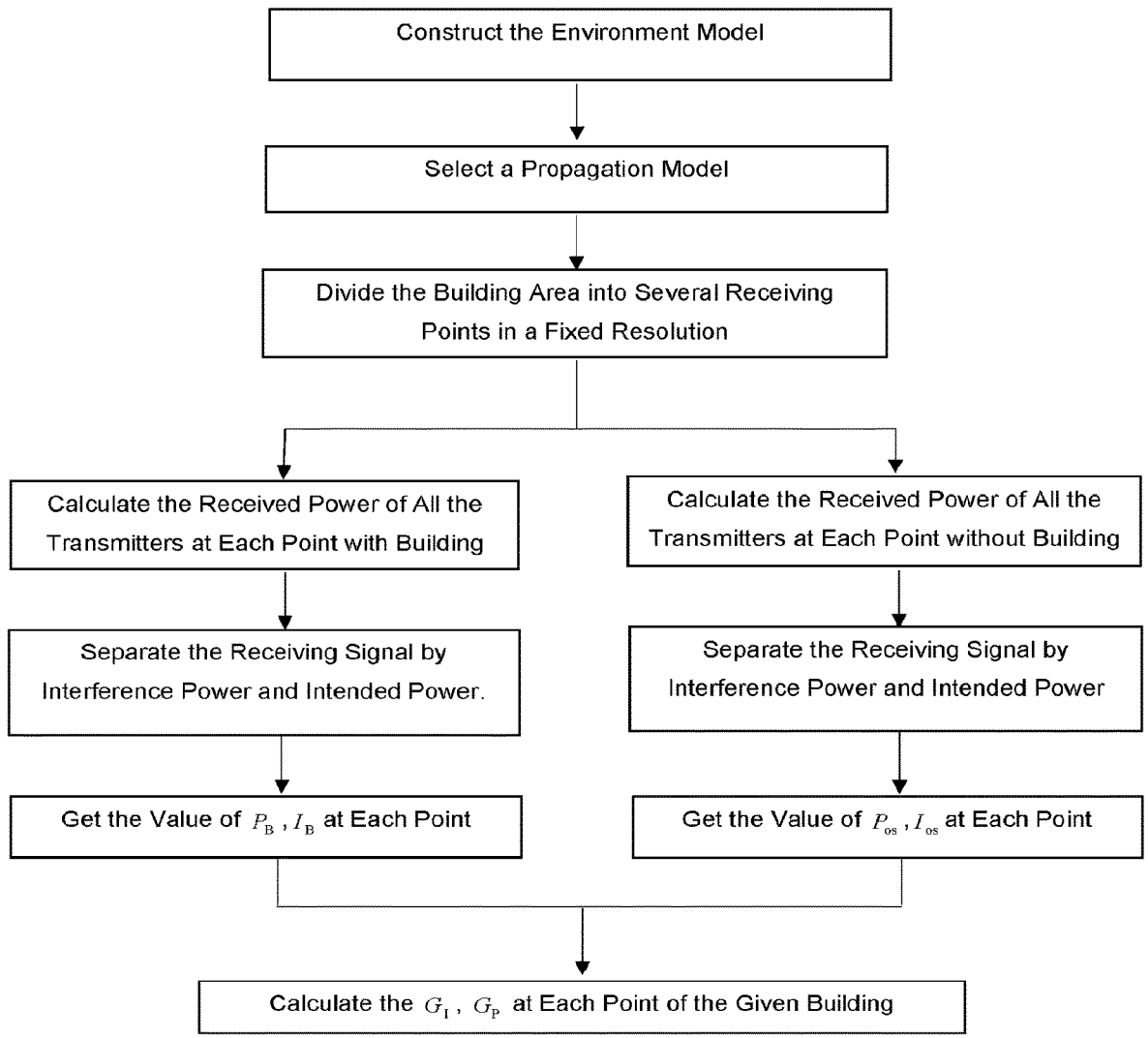
FIG. 2 is a flow diagram depicting an exemplary procedure for computing gains $G_I$ and $G_P$.

FIG. 2 is a flow diagram depicting an exemplary procedure for computing gains $G_I$ and $G_P$.

As shown in FIG. 2, the values of $G_I$ and $G_P$ could be calculated by the following process:
1. Construct an environment model, which includes the building layout, the power density of transmitters $P_T[W/m^2]$, and the considered frequency band $f_c$.
2. Select a propagation model used to calculate the path gain of the transmitter, which could be a ray-tracing based model, a ray-launching based model, a multi-slope path loss model, etc.
3. Divide the building area into a finite number of the positions of the user equipment (UE) points in a fixed resolution.
4. Calculate the received power at each UE point from all the transmitters for the building and for the open space, separately.
5. Separate the receiving signal by interference power and intended power at each UE point in conditions of with building and open space, separately.
6. Calculating the overall power values of $P_{os}$, $I_{os}$, $P_B$, and $I_B$ at each UE point.
7. Calculate the $G_I$, $G_P$ at each UE point for the building.

To get a closed form of $G_I$, $G_P$, we make the following 3 assumptions:
1. Assume that we have an infinite number of transmit elements, i.e., small cells or antenna elements, which are uniformly distributed in the environment. Infinite functions do not exist, therefore in order to simulate this assumption is it possible to model a large number of transmitters. The larger the number of transmitters modelled the closer the output is to the theoretical output of an infinite number of transmitters. That is, modelling a higher number of transmitters can increase the accuracy with which the performance of the building is evaluated. For an arbitrary area $\Omega$, the total transmit power from transmit elements within $\Omega$ is $P_T A_\Omega$, where $A_\Omega$ is the area of $\Omega$, and $P_T[W/m^2]$ denotes the transmit power from a unit area.
2. The propagation model, which should obey the convergence rule when the distance from the antenna element to the UE is infinitely large and infinitely small.
3. Assume the reference UE can take use of all detectable power constrained by the sensitivity of its receiver in the networks. The detectable power is defined as the power that are transmitted from small cells/antenna elements that satisfies $P_T L_s(R) > P_{th}$, where $s \in \{os, L, N\}$, R denotes the distance from the reference UE to the referred small cell/antenna element. $L_{os}(R)$, $L_L(R)$, and $L_N(R)$ denotes the path loss in the distance of R under open space, LOS and NLOS scenario.

Under this assumption, the overall useful power transmitted in the building area could be calculated by the following equation:

$$P = \int_{P_T L_s(R) > P_{th}} P_T L_s(R) d\Omega \quad (9)$$

The overall interference power transmitted in the building area could be calculated by the following equation:

$$I = \int_{P_T L_s(R) \geq P_{th}} P_T L_s(R) d\Omega \quad (10)$$

$R_{os}$, $R_L$ and $R_N$ are respectively introduced to denote the coverage distances under open space, LOS and NLOS scenario with $P_T L_{os}(R_{os}) = P_{th}$, $P_T L_L(R_L) = P_{th}$ and $P_T L_N(R_N) = P_{th}$.

The value of $P_{os}$, $I_{os}$ in the open space could be calculated by the following equations:

$$P_{os} = \int_0^{2\pi} \int_0^{R_{os}} P_T L_{os}(R) dR d\theta, \quad (11)$$

$$I_{os} = \int_0^{2\pi} \int_{R_{os}}^{+\infty} P_T L_{os}(R) dR d\theta. \quad (12)$$

In general, computation of $I_L$, $P_L$, $I_N$, and $P_N$ is not straightforward since the indoor scenarios are not homogeneous. To facilitate the derivation of interference and intended signal powers, we propose a toy model (TM).

A TM is the basic unit of a building area. For any type of building structure, the building structure can be separated into several TM. Each TM includes at least one of the following four areas, $\Omega_{PL}$, $\Omega_{PN}$, $\Omega_{IL}$, and $\Omega_{IN}$, where $\Omega_{PL}$, $\Omega_{IL}$, $\Omega_{PN}$, and $\Omega_{IN}$ denote the areas from where the transmitted signals are considered as LOS intended signals, LOS interference signals, NLOS intended signals, and NLOS interference signals by the reference UE, respectively. In the TM, we consider an area in the shape of a circular sector with an infinite radius. The reference UE is located in the vertex. A wall, with a finite length, is modelled as a line segment located in the sector, and end points of the line segment are respectively located in both radiuses of the circular sector. The distance from the UE to the wall is denoted as $D_0$. A polar coordinate system $(R, \theta)$ is established by choosing the UE as the reference point and the perpendicular direction of the wall as the reference angle. $\theta_l$ and $\theta_r$ respectively denote angles of end points of the wall.

Figure 3:
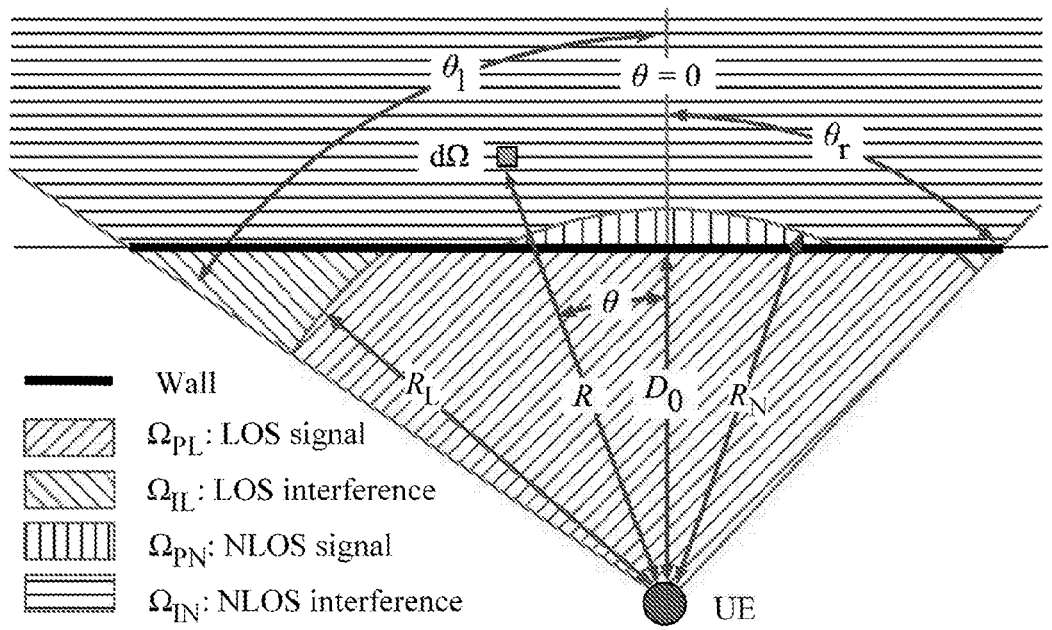
FIG. 3 depicts an example of the toy model, including schematic depictions of $\Omega_{PL}$, $\Omega_{PN}$, $\Omega_{IL}$, and $\Omega_{IN}$.

FIG. 3 depicts an example of the toy model, including schematic depictions of $\Omega_{PL}$, $\Omega_{PN}$, $\Omega_{IL}$, and $\Omega_{IN}$.

Figure 4:
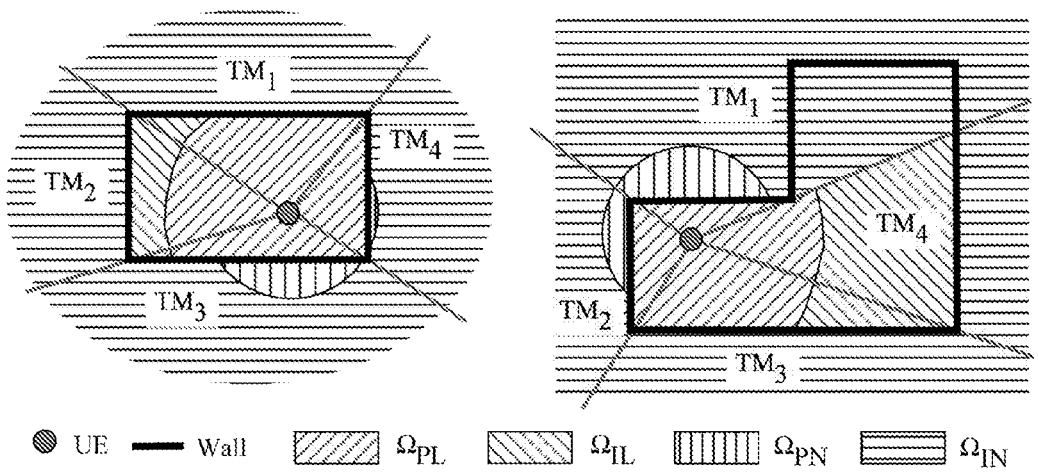
FIG. 4 depicts example uses of a toy model to schematically represent: (a) a rectangular room, and (b) an L-shaped corner room.

It is observed that rooms with line segment shaped borders, can be considered as integration of several TMs. FIG. 4 depicts example uses of a toy model to schematically represent: (a) a rectangular room, and (b) an L-shaped corner room. In an instant direction, whether an area is LOS or NLOS is determined by the closest wall. If a room is integrated by $N_{TM}$ TMs, we have $$P_L = \sum_{n_{TM}=1}^{N_{TM}} P_{L,n_{TM}}, \quad (13)$$

$$I_L = \sum_{n_{TM}=1}^{N_{TM}} I_{L,n_{TM}}, \quad (14)$$

$$P_N = \sum_{n_{TM}=1}^{N_{TM}} P_{N,n_{TM}}. \quad (15)$$

$$I_N = \sum_{n_{TM}=1}^{N_{TM}} I_{N,n_{TM}}, \quad (16)$$

Therefore, as long as we have closed form expressions $I_{L,n_{TM}}$, $P_{L,n_{TM}}$, $I_{N,n_{TM}}$, and $P_{N,n_{TM}}$, it is straightforward to compute $I_L$, $P_L$, $I_N$, and $P_N$ by (13-16).

Considering Assumption 3, for arbitrary $n_{TM}$ we have $$P_{L,n_{TM}} = \int_{\Omega_{PL}} P_T L_L(R) d\Omega \quad (17)$$

$$I_{L,n_{TM}} = \int_{\Omega_{IL}} P_T L_L(R) d\Omega \quad (18)$$

$$P_{N,n_{TM}} = \int_{\Omega_{PN}} P_T L_N(R) d\Omega \quad (19)$$

$$I_{N,n_{TM}} = \int_{\Omega_{IN}} P_T L_L(R) d\Omega \quad (20)$$

where $\Omega_{PL}$, $\Omega_{IL}$, $\Omega_{PN}$, and $\Omega_{IN}$ denote the areas, from where the transmitted signals are considered respectively as LOS intended signals, LOS interference signals, NLOS intended signals, and NLOS interference signals by the reference UE.

We choose the two-ray ground-reflection model for an example, the path loss under open space, LOS and NLOS indoor scenarios are respectively predicted as:

$$L_{os}(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq \frac{4\pi}{\lambda h_T h_R}, \\ (h_T h_R)^2 R^{-4}, & \text{when } \frac{4\pi}{\lambda h_T h_R} < R, \end{cases}$$

$$L_L(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq 1, \\ \left(\frac{\lambda}{4\pi}\right)^2 R^{-n_L}, & \text{when } 1 < R, \end{cases}$$

$$L_N(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq 1, \\ \left(\frac{\lambda}{4\pi}\right)^2 R^{-n_N}, & \text{when } 1 < R, \end{cases}$$

where $$\lambda = \frac{c}{f_c}$$

denotes the wavelength of microwave, $c=3\times10^8$[m/s] is the speed of light, $f_c$ is the center frequency, $h_T$ and $h_R$ respectively denote the transmitter height and the receiver height, and path loss exponent (PLE) $n_L$, and $n_N$ are determined by the environment. When R>1, we use $n_L$=1.73, and $n_N$=3.19 following the 3GPP indoor channel model [2] as an example. However, we would like to emphasize that the methods described herein are applicable for arbitrary $n_L$ and $n_N$.

Combine the formula (11) (12) and (21), we can get the of expression of $P_{os}$, $I_{os}$.

Combine the formula (13)(14)(17)(18) and (22), we can get the expression of $I_L$, $P_L$.

Combine the formula (15)(16)(19)(20) and (23), we can get the expression of $I_N$, $P_N$.

Then we can evaluate the building wireless performance by computing $G_I$ and $G_P$.

In some typical prior art systems, one possible way of evaluating building wireless performance is to use ray tracing/ray launching based approaches. Compared to the method described herein, ray tracing/ray launching based approaches are both computational expensive, and dependent on exact Electro Magnetic properties of materials, and 3) network deployment relevant.

In other typical prior art systems, another possible way to compute wireless performance metrics is to use Monte Carlo simulations. Compared to the method described herein, Monte Carlo simulation based approaches are time consuming, inaccurate, and unavailable for fast optimization.

During the design stages, an architect could use the method described herein for guidance regarding a building's wireless performance. By inputting a proposed building structure the architect could use the method described herein to calculate the interference power gain ($G_I$) and the intended power gain ($G_P$) for their proposed building. An architect can then modify their proposed building structure so as to modify those values. A small interference power gain $G_I$ and a large intended power gain $G_P$ are generally associated with building's that exhibit good wireless performance. Thus, an architect may look to optimise a building for wireless performance by modifying the building structure so as to minimise $G_I$ and maximise $G_P$.

In an example, a user may evaluate the wireless performance of a building by defining wireless performance levels thresholds. A new value, G, for comparison with the performance level thresholds may be defined by:

$$G = G_P - G_I$$

In this example, the value of G increases when $G_I$ is decreased and/or $G_P$ is increased. In other examples, G may be defined by any equation in which the value of G increases when $G_I$ is decreased and/or $G_P$ is increased, such as:

$$G = \frac{G_P}{G_I}; \text{ or}$$

$$G = 1 + \frac{G_P}{G_I}$$

The value, G, may be compared with one or more performance level thresholds so as to evaluate the wireless performance of a building. For example, there may be five levels of wireless performance for a building defined by four thresholds. The four thresholds may be termed: Th1, Th2, Th3 and Th4 where Th1>Th2>Th3>Th4. The thresholds may be predefined by analyzing a number of test buildings. The five wireless performance levels may be termed: Level A, Level B, Level C, Level D and Level E. The thresholds may be defined such that the test buildings are distributed across the performance levels according to a distribution rule, such as a normal distribution. When G≥Th1, the wireless performance of the building may be Level A, when Th2≤G<Th1, the wireless performance of the building may be Level B, when Th3≤G<Th2, the wireless performance of the building may be Level C, when Th4≤G<Th3, the wireless performance of the building may be Level D, when G<Th4, the wireless performance of the building may be Level E. In this example, Level A may be considered to be the best performance level and Level E may be considered to be the worst performance level. Such performance levels may be more easily understandable for the user.

The methods described herein may be embodied in an apparatus for designing and evaluating buildings. In order to evaluate the wireless performance of the building, a building model can be constructed in or imported to the apparatus. The building model can be analysed by the apparatus. The analysis can extract intermediate data to be used in the final calculation, such as a count of the number of walls, or rooms, the average wall thickness, or any other metrics. The apparatus may then request that the user inputs any further data or metrics that are required but are not derivable from the building model. For example, the user may be asked to specify the materials intended to be used for the construction of the building. The user may be asked to specify the type of building that is to be evaluated. For example, the building may be a house, an office, a shopping mall, a train or bus station, a sports or music stadium, an airport, a tunnel, a ship, or any other type of building. In other examples, this information may be available from the building model. The building model may then be evaluated by the apparatus. The apparatus may output metrics, such as the interference power gain and the intended power gain. In another example, as described herein, the apparatus may output a performance level for the building model.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for evaluating a building's wireless performance, the method comprising:
constructing an environment model, the environment model comprising a layout of the building, a power density of transmitters $P_T[W/m^2]$, and a considered frequency band $f_c$;
computing a signal to interference plus noise ratio (SINR) for the building in dependence on the environment model;
computing a SINR for an open space in dependence on the environment model, the computing size for the open space being the same as the computing size of the building, and wherein the open space is an ideal space in absence of the building or other surroundings;
comparing the SINR for the building with the SINR for the open space; and
in dependence on the comparison, evaluating the building wireless performance by calculating an interference power gain and an intended power gain for the building.

2. The method as claimed in claim 1, wherein the interference power gain and the intended power gain at a reference position of the building are defined by the following equation, $$\gamma_B = G_I \gamma_{os} + G_P,$$

where $G_I$ is the interference power gain at the reference position, $G_P$ is the intended power gain at the reference position, $\gamma_{os}$ is the SINR at the reference position for the open space, and $\gamma_B$ is the SINR at the reference position for the building.

3. The method as claimed in claim 1, wherein the SINR for the open space is computed by $$\gamma_{os} = \frac{P_{os}}{I_{os} + \sigma^2},$$

and the SINR for the building is computed by $$\gamma_B = \frac{P_B}{I_B + \sigma^2},$$

where $P_{os}$ and $I_{os}$ respectively denote an overall power of an intended signal and an interference signal at the reference position in the open space, and $P_B$ and $I_B$ respectively denote an overall power of an intended signal and an interference signal at the reference position in the building, $\sigma^2$ denotes the power of noise, and wherein the interference power gain ($G_I$) and the intended power gain ($G_P$) are calculated by:

$$G_I = \frac{I_{os} + \sigma^2}{I_B + \sigma^2},$$

$$G_P = \frac{P_B - P_{os}}{\sigma^2 + I_B}.$$

4. The method as claimed in claim 3, wherein the overall power of the intended signal $P_B$ comprises a LOS intended signal $P_L$, and an NLOS intended signal $P_N$, and the overall power of the interference signal $I_B$ comprises a LOS interference signal $I_L$, and an NLOS interference signal $I_N$, the overall power of the intended signal $P_B$ and the overall power of the interference signal $I_B$ being defined by:

$$P_B = P_L + P_N,$$

$$I_B = I_L + I_N.$$

5. The method as claimed in claim 4, wherein the interference power gain ($G_I$) and the intended power gain ($G_P$) are calculated by:

$$G_I = \frac{I_{os} + \sigma^2}{I_L + I_N + \sigma^2},$$

$$G_P = \frac{\Delta P}{I_L + I_N + \sigma^2}.$$

6. The method as claimed in claim 3, wherein the environment model comprises a building model and a network model, the building model comprising the layout of the building, and the network model comprising positions of UE, the power density of transmitters $P_T[W/m^2]$, and the considered frequency band $f_c$, and wherein the method further comprises:
1) selecting a propagation model for calculating a path loss;
2) dividing the building into one or more UE points in a fixed resolution;
3) calculating a receiving power from the transmitters in each UE point with the building;
4) calculating a receiving power from the transmitters in each UE point in the open space;
5) calculating the receiving interference signal and intended signal for each UE point within the building separately;
6) calculating the receiving interference signal and intended signal for each UE point in the open space separately;
7) calculating the overall power of interference signal $I_B$ and the overall power of intended signal $P_B$ for each UE point in the building, and the overall power of interference signal $I_{os}$ and the overall power of intended signal $P_{os}$ for each UE point in the open space;
8) calculating the interference power gain ($G_I$) and intended power gain ($G_P$) for each UE point for the building.

7. The method as claimed in claim 6, wherein the propagation model obeys the convergence rule when the distance between a transmitter and a UE is infinitely large or infinitely small.

8. The method as claimed in claim 6, wherein the network model is further restricted as an infinite number of transmitters, the transmitters being uniformly distributed in the environment, a reference UE taking use of all detectable power constrained by the sensitivity of its receiver, wherein detectable power is considered as the intended signal, and undetectable power is considered as the interference signal, wherein the detectable power is defined as the power that is transmitted from transmitters that satisfy, $P_T L_s(R) > P_{th}$, and the undetectable power is defined as the power that is transmitted from transmitters that satisfy $P_T L_s(R) \leq P_{th}$, where $s \in \{os,B\}$, R denotes the distance from the reference UE to a reference transmitter, $L_s(R)$ denotes the pathloss from the reference UE to the reference transmitter in the distance of R, $\Omega$ denote an arbitrary area, $P_{th}[W/m^2]$ denotes a threshold constrained by the sensitivity of the UE receiver, for an arbitrary area $\Omega$, the total transmit power from transmitter within $\Omega$ is $P_T A_\Omega$, where $A_\Omega$ is the area of $\Omega$; wherein the method further comprises:

calculating the intended signal, $P_{os}$, by the following equation:

$P_{os} = \int_{P_T L_{os}(R) > P_{th}} P_T L_{os}(R) d\Omega$, calculating the interference signal, $I_{os}$, by the following equation:

$I_{os} = \int_{P_T L_{os}(R) \leq P_{th}} P_T L_{os}(R) d\Omega$, calculating the intended signal $P_B$ by the following equation:

$P_B = \int_{P_T L_B(R) > P_{th}} P_T L_B(R) d\Omega$, and calculating the interference signal $I_B$ by the following equation:

$I_B = \int_{P_T L_B(R) \leq P_{th}} P_T L_B(R) d\Omega$, where $L_{os}(R)$ denotes a pathloss from the reference UE to the reference transmitter in the distance of R in the open space, $L_B(R)$ denotes a pathloss from the reference UE to the referred transmit element in the distance of R in the building model.

9. The method as claimed in claim 6, wherein the values of $P_{os}$ and $I_{os}$ are calculated by the following equations:

$$P_{os} = \int_0^{2\pi} \int_0^{R_{os}} P_T L_{os}(R) dR d\theta,$$

$$I_{os} = \int_0^{2\pi} \int_{R_{os}}^{+\infty} P_T L_{os}(R) dR d\theta,$$

where $R_{os}$ denotes the coverage distances under open space.

10. The method as claimed in claim 6, wherein the building model is separated into a plurality of $N_{TM}$ Toy Models (TM), and wherein $P_L$, $I_L$, $P_N$, and $I_N$ the following equations:

$$P_L = \sum_{n_{TM}=1}^{N_{TM}} P_{L,n_{TM}},$$

$$I_L = \sum_{n_{TM}=1}^{N_{TM}} I_{L,n_{TM}},$$

$$P_N = \sum_{n_{TM}=1}^{N_{TM}} P_{N,n_{TM}},$$

$$I_N = \sum_{n_{TM}=1}^{N_{TM}} I_{N,n_{TM}},$$

where $P_{L,n_{TM}}$, $I_{L,n_{TM}}$, $P_{N,n_{TM}}$, and $I_{N,n_{TM}}$ respectively denote the LOS intended signal, LOS interference signal, NLOS intended signal and NLOS interference signal for one TM, wherein $1 \leq n_{TM} \leq N_{TM}$.

11. The method as claimed in claim 10, wherein each TM is separated into at most four areas, the said four areas being $\Omega_{PL}$, $\Omega_{IL}$, $\Omega_{PN}$, and $\Omega_{IN}$, and wherein $P_{L,n_{TM}}$, $I_{L,n_{TM}}$, $P_{N,n_{TM}}$, and $I_{N,n_{TM}}$ are calculated by the following equations:

$P_{L,n_{TM}} = \int_{\Omega_{PL}} P_T L_L(R) d\Omega$, $I_{L,n_{TM}} = \int_{\Omega_{IL}} P_T L_L(R) d\Omega$, $P_{N,n_{TM}} = \int_{\Omega_{PN}} P_T L_N(R) d\Omega$, $I_{N,n_{TM}} = \int_{\Omega_{IN}} P_T L_L(R) d\Omega$, where $\Omega_{PL}$, $\Omega_{IL}$, $\Omega_{PN}$, and $\Omega_{IN}$ denote the areas contributing to the LOS intended signals, the LOS interference signals, the NLOS intended signals, and the NLOS interference signals at the reference UE, respectively.

12. The method as claimed in claim 6, wherein the propagation model is further defined as the two-ray ground-reflection model, and wherein the path loss in the open space, LOS and NLOS indoor scenarios are respectively predicted by the following equations:

$$L_{os}(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq \frac{4\pi}{\lambda h_T h_R}, \\ (h_T h_R)^2 R^{-4}, & \text{when } \frac{4\pi}{\lambda h_T h_R} < R, \end{cases}$$

$$L_L(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq 1, \\ \left(\frac{\lambda}{4\pi}\right)^2 R^{-n_L}, & \text{when } 1 < R, \end{cases}$$

$$L_N(R) = \begin{cases} 1, & \text{when } R \leq \frac{\lambda}{4\pi}, \\ \left(\frac{\lambda}{4\pi}\right)^2 R^{-2}, & \text{when } \frac{\lambda}{4\pi} < R \leq 1, \\ \left(\frac{\lambda}{4\pi}\right)^2 R^{-n_N}, & \text{when } 1 < R, \end{cases}$$

where $$\lambda = \frac{c}{f_c}$$

denotes the wavelength of microwave, $c = 3 \times 10^8$ [m/s] is the speed of light, $f_c$ is the center frequency, $h_T$ and $h_R$, respectively denote the transmitter's height and the receiver's height, $n_L$, and $n_N$ are the path loss exponent (PLE), the value of $n_L$, and $n_N$ are determined by the environment, $L_{os}(R)$, $L_L(R)$, and $L_R(R)$, respectively denote the path loss under open space, LOS and NLOS indoor scenarios, R denotes the distance from the reference UE to the referred transmit element.

13. The method as claimed in claim 1, wherein a wireless performance level for the building is determined in dependence on a function of the intended power gain and the interference power gain.

14. The method as claimed in claim 13, wherein the function of the intended power gain and the interference power gain is compared to one or more predetermined thresholds so as to determine the wireless performance level for the building.

15. The method as claimed in claim 2, wherein the SINR for the open space is computed by $$\gamma_{os} = \frac{P_{os}}{I_{os} + \sigma^2},$$

and the SINR for the building is computed by $$\gamma_B = \frac{P_B}{I_B + \sigma^2},$$

where $P_{os}$ and $I_{os}$ respectively denote an overall power of an intended signal and an interference signal at the reference position in the open space, and $P_B$ and $I_B$ respectively denote an overall power of an intended signal and an interference signal at the reference position in the building, $\sigma^2$ denotes the power of noise, and wherein the interference power gain $(G_I)$ and the intended power gain $(G_P)$ are calculated by:

$$G_I = \frac{I_{os} + \sigma^2}{I_B + \sigma^2},$$

$$G_P = \frac{P_B - P_{os}}{\sigma^2 + I_B}.$$

16. The method as claimed in claim 4, wherein the environment model comprises a building model and a network model, the building model comprising the layout of the building, and the network model comprising positions of UE, the power density of transmitters $P_T[W/m^2]$, and the considered frequency band $f_c$, and wherein the method further comprises:
  (1) selecting a propagation model for calculating a path loss;
  (2) dividing the building into one or more UE points in a fixed resolution;
  (3) calculating a receiving power from the transmitters in each UE point with the building;
  (4) calculating a receiving power from the transmitters in each UE point in the open space;
  (5) calculating the receiving interference signal and intended signal for each UE point within the building separately;
  (6) calculating the receiving interference signal and intended signal for each UE point in the open space separately;
  (7) calculating the overall power of interference signal $I_B$ and the overall power of intended signal $P_B$ for each UE point in the building, and the overall power of interference signal $I_{os}$ and the overall power of intended signal $P_{os}$ for each UE point in the open space;
  (8) calculating the interference power gain $(G_I)$ and intended power gain $(G_P)$ for each UE point for the building.

17. The method as claimed in claim 5, wherein the environment model comprises a building model and a network model, the building model comprising the layout of the building, and the network model comprising positions of UE, the power density of transmitters $P_T[W/m^2]$, and the considered frequency band $f_c$, and wherein the method further comprises:
  (1) selecting a propagation model for calculating a path loss;
  (2) dividing the building into one or more UE points in a fixed resolution;
  (3) calculating a receiving power from the transmitters in each UE point with the building;
  (4) calculating a receiving power from the transmitters in each UE point in the open space;
  (5) calculating the receiving interference signal and intended signal for each UE point within the building separately;
  (6) calculating the receiving interference signal and intended signal for each UE point in the open space separately;
  (7) calculating the overall power of interference signal $I_B$ and the overall power of intended signal $P_B$ for each UE point in the building, and the overall power of interference signal $I_{os}$ and the overall power of intended signal $P_{os}$ for each UE point in the open space;
  (8) calculating the interference power gain $(G_I)$ and intended power gain $(G_P)$ for each UE point for the building.

18. The method as claimed in claim 7, wherein the network model is further restricted as an infinite number of transmitters, the transmitters being uniformly distributed in the environment, a reference UE taking use of all detectable power constrained by the sensitivity of its receiver, wherein detectable power is considered as the intended signal, and undetectable power is considered as the interference signal, wherein the detectable power is defined as the power that is transmitted from transmitters that satisfy, $P_T L_s(R) > P_{th}$, and the undetectable power is defined as the power that is transmitted from transmitters that satisfy $P_T L_s(R) \leq P_{th}$, where $s \in \{os, B\}$, R denotes the distance from the reference UE to a reference transmitter, $L_s(R)$ denotes the pathloss from the reference UE to the reference transmitter in the distance of R, $\Omega$ denote an arbitrary area, $P_{th}[W/m^2]$ denotes a threshold constrained by the sensitivity of the UE receiver, for an arbitrary area $\Omega$, the total transmit power from transmitter within $\Omega$ is $P_T A_\Omega$, where $A_\Omega$ is the area of $\Omega$; wherein the method further comprises:
  calculating the intended signal, $P_{os}$, by the following equation:

$$P_{os} = \int_{P_T L_{os}(R) > P_{th}} P_T L_{os}(R) d\Omega,$$

calculating the interference signal, $I_{os}$, by the following equation:

$$I_{os} = \int_{P_T L_{os}(R) \leq P_{th}} P_T L_{os}(R) d\Omega,$$

calculating the intended signal $P_B$ by the following equation:

$$P_B = \int_{P_T L_B(R) > P_{th}} P_T L_B(R) d\Omega,$$

and calculating the interference signal $I_B$ by the following equation:

$$I_B = \int_{P_T L_B(R) \leq P_{th}} P_T L_B(R) d\Omega,$$

where $L_{os}(R)$ denotes a pathloss from the reference UE to the reference transmitter in the distance of R in the open space, $L_B(R)$ denotes a pathloss from the reference UE to the referred transmit element in the distance of R in the building model.

19. The method as claimed in claim 7, wherein the values of $P_{os}$ and $I_{os}$ are calculated by the following equations:

$$P_{os} = \int_0^{2\pi} \int_0^{R_{os}} P_T L_{os}(R) dR d\theta,$$

$$I_{os} = \int_0^{2\pi} \int_{R_{os}}^{+\infty} P_T L_{os}(R) dR d\theta,$$

where $R_{os}$ denotes the coverage distances under open space.

20. The method as claimed in claim 8, wherein the values of $P_{os}$ and $I_{os}$ are calculated by the following equations:

$$P_{os} = \int_0^{2\pi} \int_0^{R_{os}} P_T L_{os}(R) dR d\theta,$$

$$I_{os} = \int_0^{2\pi} \int_{R_{os}}^{+\infty} P_T L_{os}(R) dR d\theta,$$

where $R_{os}$ denotes the coverage distances under open space.

* * * * *